(12) United States Patent
Wang et al.

(10) Patent No.: US 12,418,742 B2
(45) Date of Patent: Sep. 16, 2025

(54) WIRELESS EARPHONE WITH RADAR CAPABILITIES

(71) Applicant: KaikuTek Inc., Taipei (TW)

(72) Inventors: Mike Chun-Hung Wang, Taipei (TW); Chih-Ying Wei, Taipei (TW); Hsi-Yu Tseng, Taipei (TW); Ching-Chih Kuo, Taipei (TW); Ming-Te Lin, Taipei (TW)

(73) Assignee: KAIKUTEK INC., Taipei (TW)

( * ) Notice: Subject to any disclaimer, the term of this patent is extended or adjusted under 35 U.S.C. 154(b) by 232 days.

(21) Appl. No.: 18/343,332

(22) Filed: Jun. 28, 2023

(65) Prior Publication Data

US 2024/0365042 A1 Oct. 31, 2024

(30) Foreign Application Priority Data

Apr. 26, 2023 (TW) ................................ 112115632

(51) Int. Cl.
*H04R 1/10* (2006.01)
*G01S 13/06* (2006.01)
*G06F 1/16* (2006.01)
*G06F 3/01* (2006.01)

(52) U.S. Cl.
CPC ............ *H04R 1/1041* (2013.01); *G01S 13/06* (2013.01); *G06F 1/163* (2013.01); *G06F 3/017* (2013.01); *H04R 2460/03* (2013.01); *H04R 2460/07* (2013.01)

(58) Field of Classification Search
CPC ....... H04R 1/1041; G01S 13/06; G06F 1/163; G06F 3/017
See application file for complete search history.

(56) References Cited

U.S. PATENT DOCUMENTS

| | | | |
|---|---|---|---|
| 11,442,160 B2 | 9/2022 | Baheti et al. | |
| 2019/0064344 A1* | 2/2019 | Turner | G08B 21/02 |
| 2024/0305936 A1* | 9/2024 | Milne | H04R 25/552 |
| 2025/0060782 A1* | 2/2025 | Mahmud | G06F 18/24 |

FOREIGN PATENT DOCUMENTS

| | | |
|---|---|---|
| CN | 110018471 A | 7/2019 |
| CN | 111010643 A | 4/2020 |
| TW | M509493 U | 9/2015 |

* cited by examiner

*Primary Examiner* — Simon King
(74) *Attorney, Agent, or Firm* — RABIN & BERDO, P.C.

(57) ABSTRACT

A wireless earphone with radar capabilities includes a first earphone having a first detection unit and a container. When the first earphone is placed inside the container, a first detection wave generated by the first detection unit passes through the container. The first detection wave is reflected from a human body as a first reflected wave, and when the first detection unit receives the first reflected wave through the container, the first detection unit generates a first detection result data and sends the first detection result data to an external device. The container containing the first earphone allows a user to hold the container with the first earphone within, and since the first earphone continues to detect movements outside of the container, the container is transformed into a multifunctional controller or detector for adapting to new application modes initiated by the external device.

19 Claims, 10 Drawing Sheets

WIRELESS EARPHONE WITH RADAR CAPABILITIES

CROSS-REFERENCE TO RELATED APPLICATION(S)

This application claims the priority benefit of TW application serial No. 112115632 filed on Apr. 26, 2023, the entirety of which is hereby incorporated by reference herein and made a part of the specification.

BACKGROUND OF THE INVENTION

1. Field of the Invention

The present invention relates to a wireless earphone, more particularly a wireless earphone with radar capabilities.

2. Description of the Related Art

In this day and age, most commercially available wireless headphones only have a singular function of playing music or playing audio. When a user finishes using the wireless headphones and stops listening to music, the user naturally puts the wireless earphones into a container for storing and/or charging the wireless earphones. As such, the wireless earphones will automatically switch off after a set amount of time, or rather, the wireless earphones will automatically switch off once starting charging. However, the aforementioned course of actions for using the wireless headphones are too simplistic and limiting. The wireless headphones are being used without having their full potential explored.

SUMMARY OF THE INVENTION

To overcome the aforementioned problem, the present invention provides a wireless earphone with radar capabilities. The wireless earphone with radar capabilities of the present invention is able to detect movements of a user through a radar, and furthermore, the wireless earphone with radar capabilities continues to detect movements outside of a container by using the radar to generate radar waves even after being stored inside the container. As such, a new function of the wireless headphone is created after storing the wireless headphone in the container, and thus a novel application is explored for the wireless headphone.

The wireless earphone with radar capabilities includes:
a first earphone, having:
  a first communications unit, configured to wirelessly connect to an external device;
  a first audio unit, electrically connected to the first communications unit; wherein when the first audio unit receives an audio signal from the external device through the first communications unit, the first audio unit generates a first audio according to the audio signal;
  a first detection unit, electrically connected to the first communications unit, and generating a first detection wave; wherein the first detection wave is reflected from an object as a first reflected wave; when the first detection unit receives the first reflected wave, the first detection unit generates a first detection result data, and the first detection unit sends the first detection result data to the external device through the first communications unit; wherein the object is moving or vibrating as a living organism or an inorganic object;
a container, configured to contain the first earphone; wherein when the first earphone is placed inside the container, the first detection unit continues to send the first detection wave and to receive the first reflected wave, and the first communications unit maintains a wireless connection to the external device.

In other words, when the first earphone is placed inside the container, the first earphone of the present invention continues to generate the first detection wave that passes through the container, and continues to receive the first reflected wave that also passes through the container for continuously detecting movements outside of the container. With the first earphone inside, the container enables the user of the present invention to easily hold onto both the container and the first earphone inside of the container, while simultaneously, the first detection unit of the first earphone still continuously detects movements outside of the container from within the container. As a result, the container with the first earphone therein is transformed into a multi-functional controller or detector. This allows the first earphone and the container of the present invention to satisfy other novel functions relating to control or detection apart from just having a simple function of playing audios.

In an embodiment of the present invention, after the first earphone is placed inside the container, the container containing the first earphone is transformed into a game controller. The container containing the first earphone is configured to receive controls from a user when the user plays a game displayed on the external device. In this situation, the first detection result data sent by the container containing the first earphone to the external device is a game control signal generated by the game controller.

In another embodiment of the present invention, after the first earphone is placed inside the container, the container containing the first earphone is transformed into a presentation controller. The container containing the first earphone is configured to receive controls from the user when the user controls the presentation displayed on the external device. In this situation, the first detection result data sent by the container containing the first earphone to the external device is a presentation control signal generated by the presentation controller.

In yet another embodiment of the present invention, after the first earphone is placed inside the container, the container containing the first earphone is transformed into a detector for monitoring a health status of the user. The container containing the first earphone is configured to detect and monitor a breathing frequency or a pulse of the user. In this situation, the first detection result data sent by the container containing the first earphone to the external device is a health information generated by the detector for monitoring the health status of the user.

DETAILED DESCRIPTION OF THE INVENTION

Figure 1:
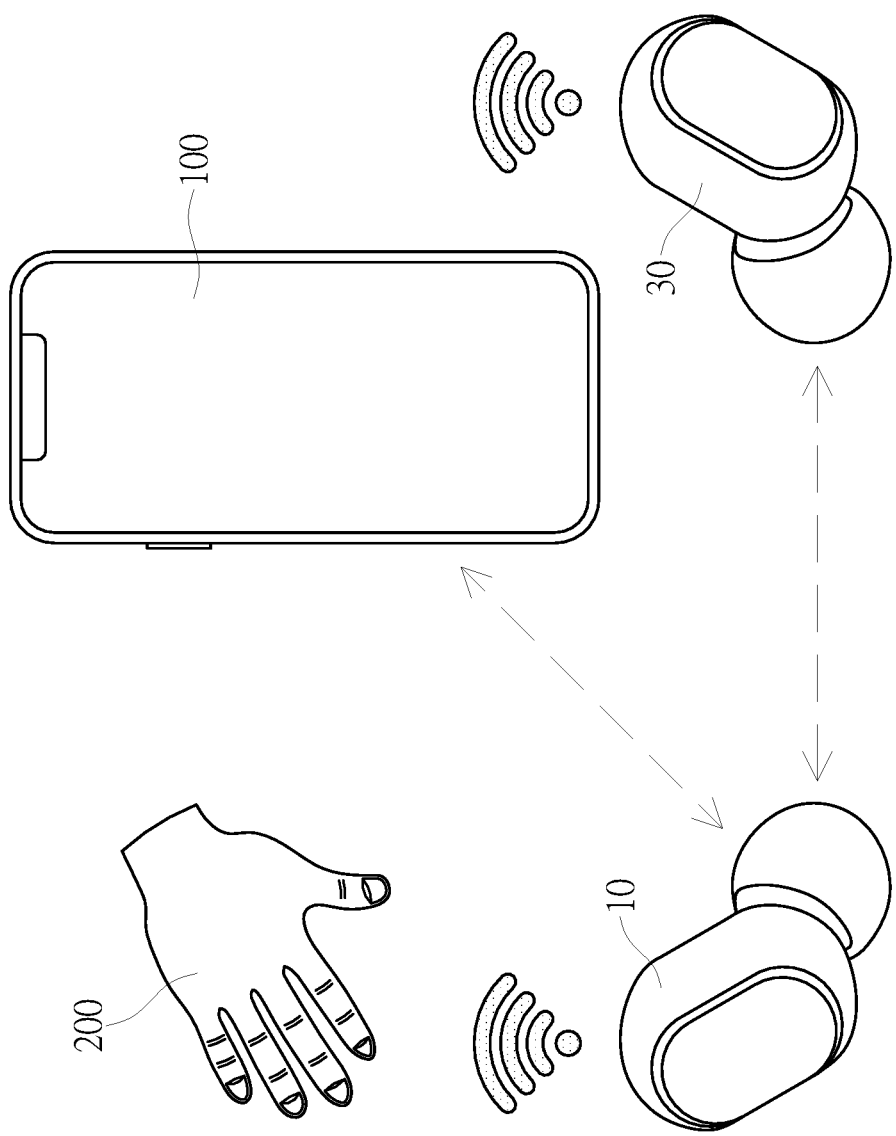
FIG. 1 is a perspective view of a wireless earphone with radar capabilities of the present invention.
Figure 1:
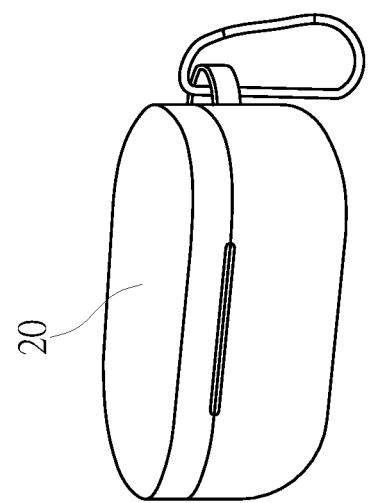
Figure 2:
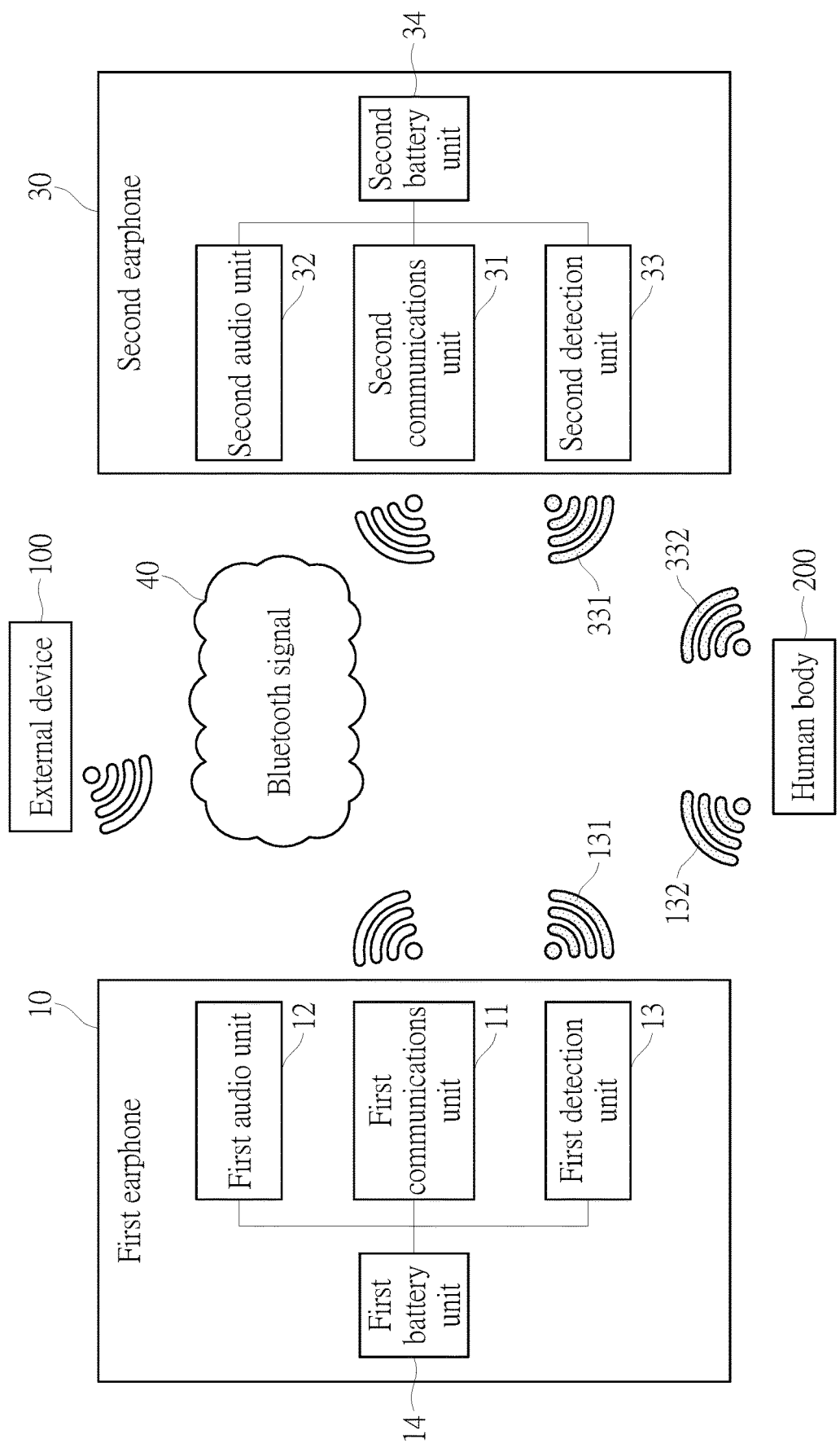
FIG. 2 is a block diagram of the wireless earphone with radar capabilities of the present invention.

With reference to FIGS. 1 and 2, the present invention provides a wireless earphone with radar capabilities. The wireless earphone with radar capabilities includes a first earphone 10 and a container 20. The first earphone 10 is configured to be used together with an external device 100.

The external device 100 is a conventional device that is able to connect to wireless earphones. For example, the external device 100 is a smart phone, a computer, a tablet computer, or any other type of smart device that is able to connect to a wireless network. The external device 100 communicates with the first earphone 10 of the present invention through a computer program or an application (APP).

The first earphone 10 of the present invention has a first communications unit 11, a first audio unit 12, and a first detection unit 13. The first communications unit 11 is respectively electrically connected to the first audio unit 12 and the first detection unit 13.

The first communications unit 11 is configured to wirelessly connect to the external device 100. In an embodiment of the present invention, the first communications unit 11 uses Bluetooth to wirelessly connect to the external device 100. In other words, the external device 100 and the first communications unit 11 wirelessly communicate with a Bluetooth signal 40. The external device 100 may be a conventional device that connects to wireless headphones, and may be able to generate an audio signal for the wireless headphones to play. The external device 100 sends the audio signal to the first communications unit 11 of the present invention. When the first audio unit 12 receives the audio signal from the external device 100 through the first communications unit 11, the first audio unit 12 generates a first audio according to the audio signal and thus the first audio unit 12 plays the first audio.

The first detection unit 13 of the present invention generates a first detection wave 131. The first detection wave 131 contacts an object and is reflected from the object as a first reflected wave 132. When the first detection unit 13 receives the first reflected wave 132, the first detection unit 13 generates a first detection result data, and the first detection unit 13 sends the first detection result data to the external device 100 through the first communications unit 11. The object detected by the present invention is free to be of any kind; in other words, the object is a living organism or an inorganic object that is moving or vibrating, allowing the object to be radar-detectable. For example, in the present invention, the object detected by the present invention is a human body 200. In another embodiment, the object may also be the living organism of any other kind, such as an animal like a cat, a dog, or a rabbit, etc. The object may also be the inorganic object, such as a toy, a motor, or a machine, etc. Of course, the object may also be a combination of the two, for example, a boy holding a baseball bat. The following embodiments use the human body 200 as the object being detected by the present invention as demonstrations of applications enabled by the present invention.

The container 20 is configured to store the first earphone 10. When the first earphone 10 is placed inside the container 20, the first detection unit 13 continues to send the first detection wave 131 and to receive the first reflected wave 132, and the first communications unit 11 maintains a wireless connection to the external device 100. The container 20 of the present invention has a non-metal shell, for example, a plastic shell. As such, the first detection wave 131 generated by the first detection unit 13 is able to pass through the container 20, and similarly, the first detection unit 13 is able to receive the first reflected wave 132 that passes through the container 20. In the present embodiment, the first detection unit 13 includes antennas for transmitting and receiving electromagnetic waves as radar signals. The first detection wave 131 transmitted by the first detection unit 13 and the first reflected wave 132 received by the first detection unit 13 are both millimeter waves (mmWaves). After the first earphone 10 is placed inside the container 20, the first detection wave 131 and the first reflected wave 132 as millimeter waves are generally unaffected by the container 20. Without being blocked by the container 20, the first detection wave 131 and the first reflected wave 132 are used by the first detection unit 13 for detecting movements outside of the container 20.

After the first earphone 10 is placed inside the container 20, the first earphone 10 of the present invention continues to generate the first detection wave 131 that passes through the container 20, and continues to receive the first reflected wave 132 that also passes through the container 20 for continuously detecting movements outside of the container 20. With the first earphone 10 inside, the container 20 enables a user of the present invention to easily hold onto both the container 20 and the first earphone 10 inside of the container 20, while simultaneously, the first detection unit 13 of the first earphone 10 still continuously detects movements outside of the container 20 from within the container 20. As a result, the container 20 with the first earphone 10 therein is transformed into a multifunctional controller or detector. This allows the first earphone 10 and the container 20 of the present invention to satisfy other novel functions relating to control or detection apart from just having a simple function of playing audios.

Furthermore, the first detection unit 13 is a unit capable of detecting body movements of the user with millimeter radar waves. A hardware of the first detection unit 13 is a system on a chip (SoC) that integrates radar antennas, a memory, and a processor. The memory integrated within the first detection unit 13 stores a pre-trained artificial intelligence (AI) detection model. The pre-trained AI detection model is able to help identifying body movements of the user detected by the radar waves, and thus help the first detection unit 13 to generate the first detection result data. For the pre-trained AI detection model stored in the memory inside the first detection unit 13, weights used by the pre-trained AI detection model are able to be updated. In an embodiment, the weights used by the pre-trained AI detection model are updated by the external device 100. In other words, when the first communications unit 11 is communicatively connected to the external device 100, the pre-trained AI detection model stored in the first detection unit 13 is updated by the external device 100.

Figure 3:
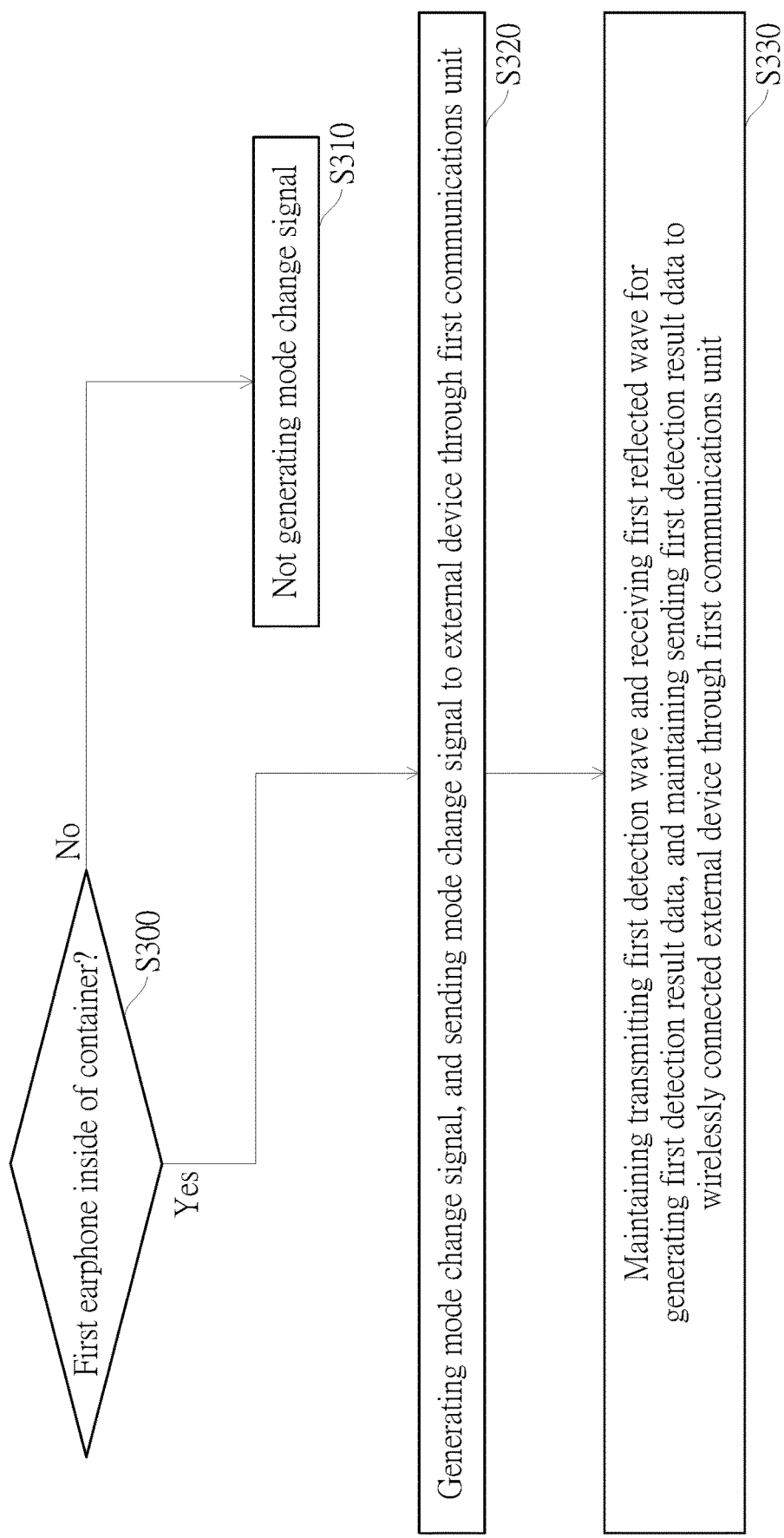
FIG. 3 is a flow chart for the wireless earphone with radar capabilities in an embodiment of the present invention.

With reference to FIG. 3, in the current embodiment, a wall of the container 20 minimally reflects the first detection wave 131. As such, the first reflected wave 132 received by the first detection unit 13 also reflects information of being partially reflected from the wall of the container 20. This information will be present in the first detection result data generated by the first detection unit 13 according to the first reflected wave 132. The first detection unit 13 of the first earphone 10 executes the following steps:

Step S300: determining whether the first earphone 10 is placed inside the container 20 according to the first detection result data. For instance, in an embodiment, determining whether the first detection result data presents an information that a distance the first reflected wave 132 is reflected off equals a particular distance, wherein the particular distance is a given distance between the first earphone 10 and the wall of the container 20; if yes, then determining that the first earphone 10 is placed inside the container 20, or else, determining that the first earphone 10 is still outside of the container 20.

Step S310: when determining that the first earphone 10 is still outside of the container 20, not generating a mode change signal by the first detection unit 13.

Step S320: when determining that the first earphone 10 is placed inside the container 20, generating the mode change signal by the first detection unit 13, and sending the mode change signal to the external device 100 through the communications unit 11.

Step S330: maintaining transmitting the first detection wave 131 and receiving the first reflected wave 132 for generating the first detection result data, and maintaining sending the first detection result data to the external device 100 that is wirelessly connected through the communications unit 11.

With reference to FIGS. 1 and 2, in another embodiment, the present invention further includes a second earphone 30. The first earphone 10 and the second earphone 30 form a pair of wireless earphones, as the first earphone 10 is a primary earphone and the second earphone 30 is a secondary earphone. The primary earphone may be either a left ear wireless earphone or a right ear wireless earphone, and the secondary earphone is a corresponding wireless earphone on an opposite side to the primary earphone. The first earphone 10 and the second earphone 30 are connected via Bluetooth; more particularly, the first earphone 10 is respectively connected to the second earphone 30 and the external device 100 by using True Wireless Stereo (TWS). The first communications unit 11 of the first earphone 10 sends the Bluetooth signal to the second earphone 30 for communicatively connecting to the second earphone 30.

The second earphone 30 includes a second communications unit 31, a second audio unit 32, and a second detection unit 33. The second communications unit 31 is respectively electrically connected to the second audio unit 32 and the second detection unit 33.

The second communications unit 31 is wirelessly connected to the first communications unit 11 for communicating to the first earphone 10. When the first communications unit 11 receives the audio signal from the external device 100, the first communications unit 11 sends the audio signal to the second communications unit 31. When the second audio unit 32 receives the audio signal from the first communications unit 11 through the second communications unit 31, the second audio unit 32 generates a second audio according to the audio signal and thus the second audio unit 32 plays the second audio. For example, the first audio played by the first audio unit 12 and the second audio played by the second audio unit 32 are respectively a left ear soundtrack and a right ear soundtrack played by the external device 100 through the present invention.

The second detection unit 33 generates a second detection wave 331. The second detection wave 331 contacts the object, such as the human body 200, and is reflected from the human body 200 as a second reflected wave 332. When the second detection unit 33 receives the second reflected wave 332, the second detection unit 33 generates a second detection result data, and the second detection unit 33 sends the second detection result data to the first communications unit 11 through the second communications unit 31. When the first communications unit 11 receives the second detection result data from the second communications unit 31, the first communications unit 11 sends the second detection result data to the external device 100.

The container 20 is also configured to store the second earphone 30. When the second earphone 30 is placed inside the container 20, the second detection unit 33 continues to send the second detection wave 331 and to receive the second reflected wave 332, and the second communications unit 31 maintains a wireless connection to the first communications unit 11. The second detection wave 331 generated by the second detection unit 33 is also able to pass through the container 20, and similarly, the second detection unit 33 is able to receive the second reflected wave 332 that passes through the container 20.

As such, when both the first earphone 10 and the second earphone 30 are placed inside the container 20, the first earphone 10 and the second earphone 30 respectively generate the first detection wave 131 and the second detection wave 331, and the first earphone 10 and the second earphone 30 respectively receive the first reflected wave 132 and the second reflected wave 332 for respectively generating the first detection result data and the second detection result data. In an embodiment, the first earphone 10 and the second earphone 30 are fixed facing two different directions inside of the container 20, and therefore the first earphone 10 and the second earphone 30 are generating and receiving electromagnetic waves at different directions. Since the first earphone 10 and the second earphone 30 are detecting movements in different directions, the first detection result data and the second detection result data are independent from each other. The second detection wave 331 generated from the second detection unit 33 and the second reflected wave 332 received by the second detection unit 33 are also millimeter waves.

Figure 4:
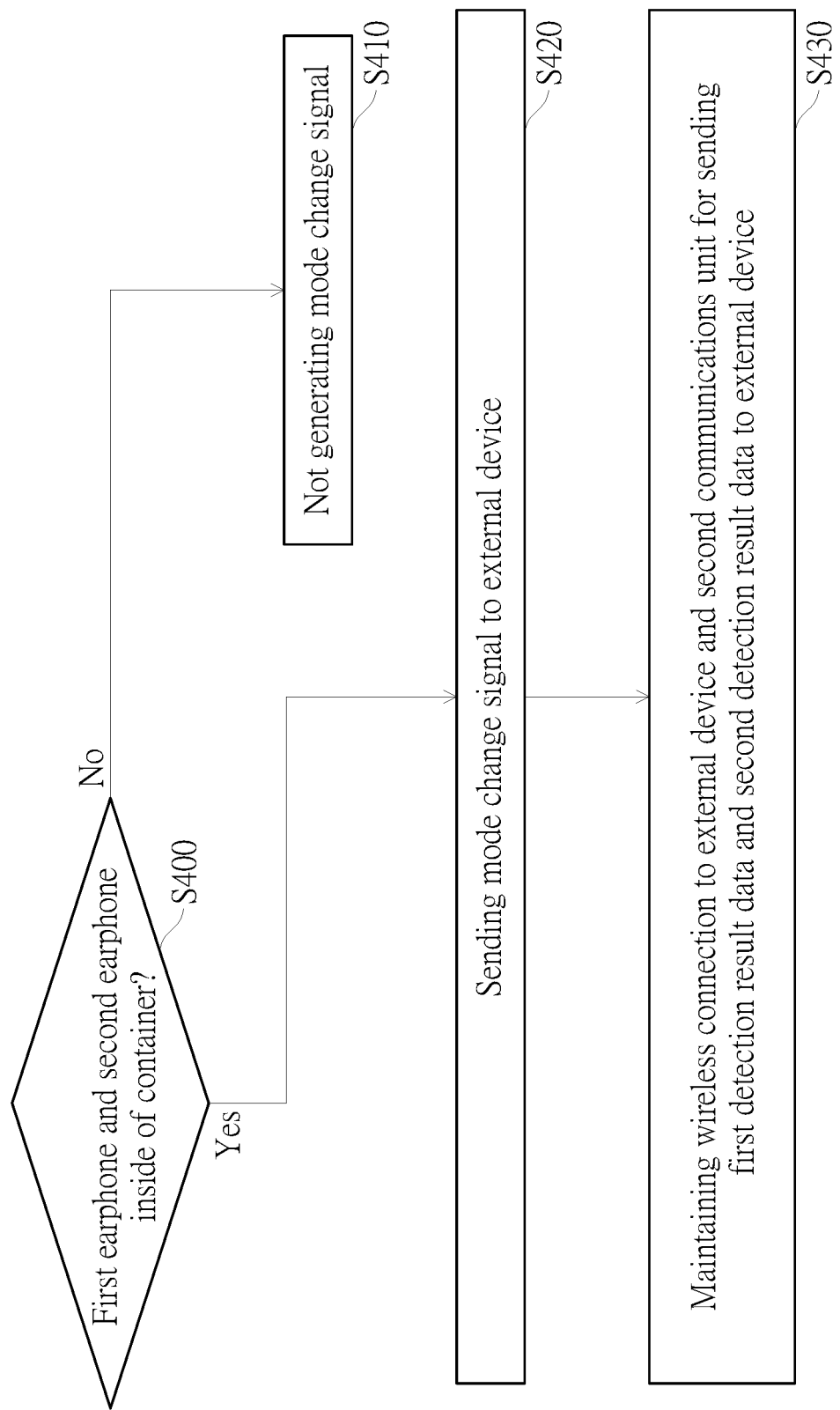
FIG. 4 is a flow chart for the wireless earphone with radar capabilities in another embodiment of the present invention.

With reference to FIG. 4, in the present embodiment, the wall of the container 20 minimally reflects the second detection wave 331. As such, the second reflected wave 332 received by the second detection unit 33 also reflects information of being partially reflected from the wall of the container 20. This information will also be present in the second detection result data generated by the second detection unit 33 according to the second reflected wave 132.

After receiving the second detection result data, the first communications unit 11 of the first earphone 10 executes the following steps:

Step S400: determining whether the first earphone 10 and the second earphone 30 are simultaneously present inside of the container 20 according to the first detection result data and the second detection result data. In this embodiment, the first communications unit 11 determines whether the second earphone 30 is placed inside the container 20 by using the same method that the first detection unit 13 determines whether the first earphone 10 is placed inside the container 20.

Step S410: when determining that either the first earphone 10 or the second earphone 30 is still outside of the container 20, not sending out the mode change signal from the first communications unit 11.

Step S420: when determining the first earphone 10 and the second earphone 30 are simultaneously present inside of the container 20, sending the mode change signal from the first communications unit 11 to the external device 100.

Step S430: maintaining the wireless connections to the external device 100 and the second communications unit 31 for sending the first detection result data and the second detection result data to the external device 100.

Figure 5:
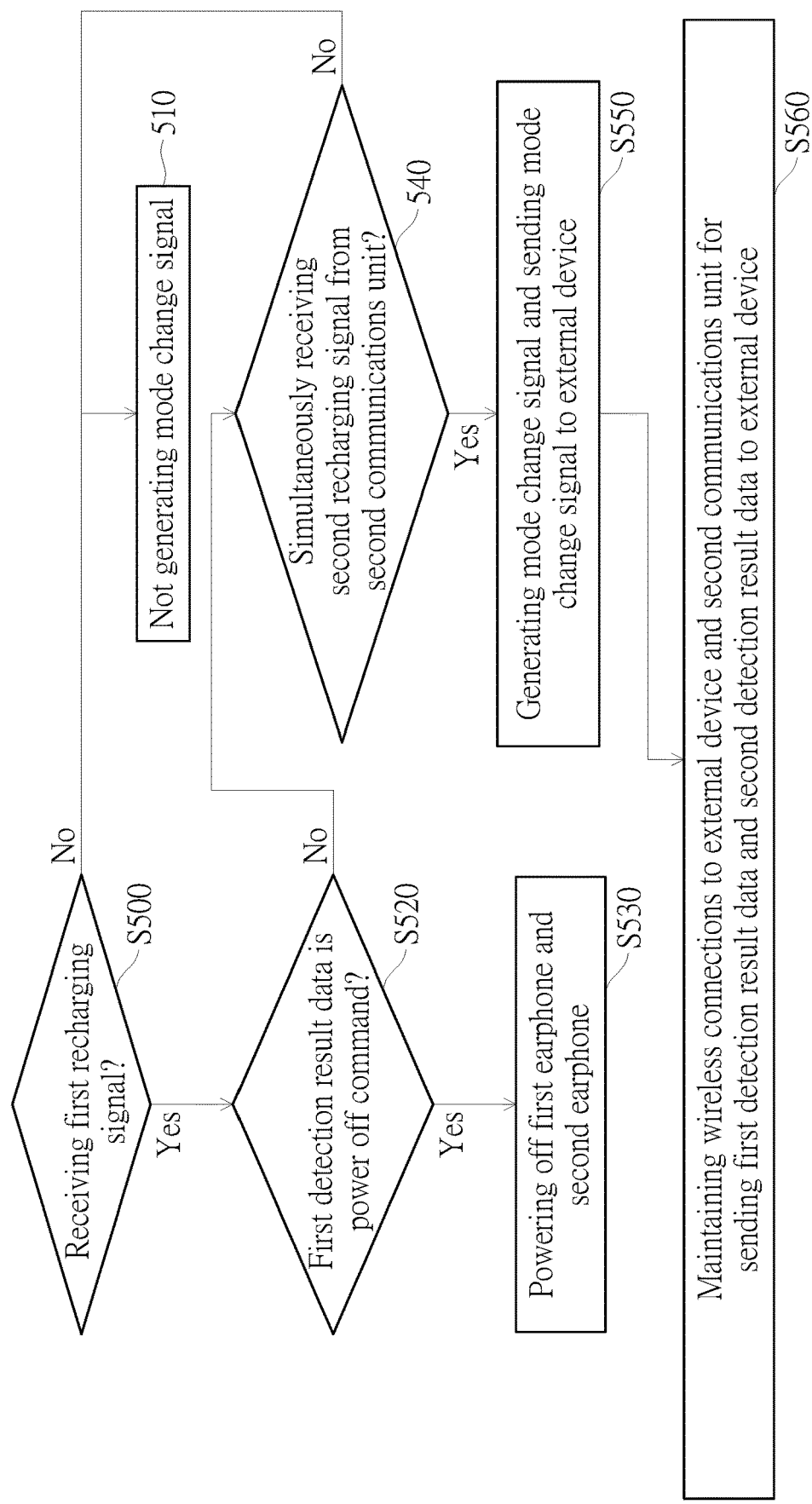
FIG. 5 is a flow chart for the wireless earphone with radar capabilities in yet another embodiment of the present invention.

With reference to FIGS. 2 and 5, in an embodiment of the present invention, the first earphone 10 further includes a first battery unit 14, and the second earphone 30 further includes a second battery unit 34. The first battery unit 14 is respectively electrically connected to the first communications unit 11, the first audio unit 12, and the first detection unit 13. The second battery unit 34 is respectively electrically connected to the second communications unit 31, the second audio unit 32, and the second detection unit 33. The first battery unit 14 holds a first earphone charge, and the second battery unit 34 holds a second earphone charge.

The container 20 includes a recharge socket and a recharge battery. The recharge battery holds a recharge station charge, and the recharge battery is electrically connected to the recharge socket. The recharge socket is configured to respectively electrically connect to the first battery unit 14 of the first earphone 10 and the second battery unit 34 of the second earphone 30.

When the recharge socket is electrically connected to the first battery unit 14, the recharge battery starts recharging the first battery unit 14 with the recharge station charge through the recharge socket, and the first battery unit 14 generates a first recharging signal to the first communications unit 11. Similarly, when the recharge socket is electrically connected to the second battery unit 34, the recharge battery starts recharging the second battery unit 34 with the recharge station charge through the recharge socket, and the second battery unit 34 generates a second recharging signal to the second communications unit 31. When the second communications unit 31 receives the second recharging signal from the second battery unit 34, the second communications unit 31 sends the second recharging signal to the first communications unit 11.

The first communications unit 11 of the first earphone 10 executes the following steps:

Step S500: determining whether receiving the first recharging signal from the first battery unit 14.

Step S510: when without receiving the first recharging signal from the first battery unit 14, not generating the mode change signal by the first communications unit 11.

Step S520: when receiving the first recharging signal from the first battery unit 14, further determining whether the first detection result data is a power off command.

Step S530: when determining the first detection result data is the power off command, powering off the first earphone 10 and the second earphone 30.

Step S540: when determining the first detection result data is elsewise than the power off command, further determining whether simultaneously receiving the second recharging signal from the second communications unit 31; when determining without simultaneously receiving the second recharging signal from the second communications unit 31, executing step S510.

Step S550: when determining simultaneously receiving the first recharging signal from the first battery unit 14 and receiving the second recharging signal from the second communications unit 31, determining that the first earphone 10 and the second earphone 30 are simultaneously placed inside of the container 20 and thus generating the mode change signal and sending the mode change signal to the external device 100.

Step S560: maintaining the wireless connections to the external device 100 and the second communications unit 31 for sending the first detection result data and the second detection result data to the external device 100.

In the current embodiment, after the user places the first earphone 10 and the second earphone 30 inside of the container 20, the user is able to make a hand gesture to power off the first earphone 10 and the second earphone 30. However, if the user lets the first earphone 10 and the second earphone 30 stay powered, the first earphone 10 will generate the mode change signal and send the mode change signal to the external device 100. As a result, the first earphone 10 and the second earphone 30 will continue to function under a new application mode. This way, the first earphone 10 and the second earphone 30, under the new application mode set by the external device 100, will bring forth the user of the present invention new experiences unrelated to just simply playing audios.

Figure 6:
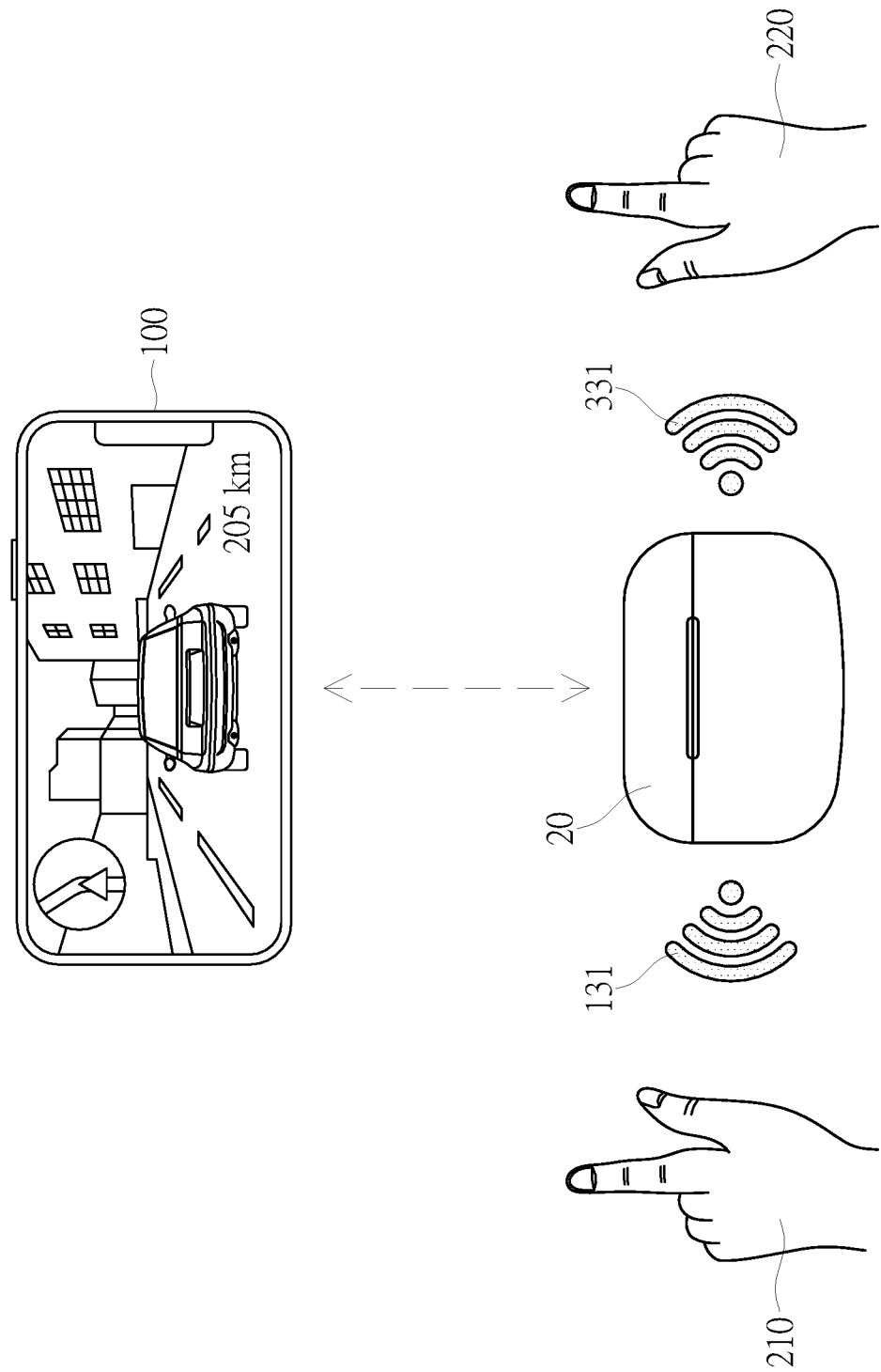
FIG. 6 is a perspective view of an application of the wireless earphone with radar capabilities in an embodiment of the present invention.

With reference to FIG. 6, in the current embodiment, the first detection unit 13 and the second detection unit 33 are respectively facing a left side and a right side outside of the container 20. The first detection unit 13 and the second detection unit 33 respectively generate the first detection wave 131 and the second detection wave 331 aimed at hands of the human body 200 of the user. This way, the first detection unit 13 and the second detection unit 33 are able to respectively detect the first reflected wave 132 and the second reflected wave 332 respectively reflected from a left hand gesture 210 and a right hand gesture 220 posed by the user. As a result, the first detection unit 13 generates the first detection result data according to the first reflected wave 132 corresponding to the left hand gesture 210, and the second detection unit 33 generates the second detection result data according to the second reflected wave 332 corresponding to the right hand gesture 220. The first detection result data and the second detection result data are respectively a hand gesture detection result data.

When the external device 100 in cooperation with the present invention receives the mode change signal from the first communications unit 11, the external device 100 changes an application mode for cooperating with the present invention. The change of application mode can be, for example, switching mode from using the first earphone 10 and the second earphone 30 of the present invention to play music or play audio to other application modes such as using the first earphone 10 and the second earphone 30 of the present invention to play games, to control presentation slides, and to monitor health, etc. The present invention is multifunctional in its ability to cooperate with the external device 100 for various applications. Application modes initiated by the external device 100 on the present invention is free to be elsewise than the few examples mentioned in the present invention.

In the present embodiment, after the first earphone 10 and the second earphone 30 are placed in the container 20, the container 20 with the first earphone 10 and the second earphone 30 placed within is transformed into a game controller. The said game controller is configured to detect the left hand gesture 210 and the right hand gesture 220 posed by the user on opposite sides outside of the container 20 with radar waves generated by the first earphone 10 and the second earphone 30 inside of the container 20. Such detection of the left hand gesture 210 and the right hand gesture 220 allows the user to move hands for controlling the game displayed on the external device 100. In this situation, the first detection result data and the second detection result data sent by the present invention to the external device 100 are game control signals generated by the game controller. In the example shown in FIG. 6, the container 20 with the first earphone 10 and the second earphone 30 placed within is transformed into a virtual steering wheel for controlling a car racing game, and the user is able to rotate a direction of the virtual steering wheel by moving hand gestures.

Figure 7:
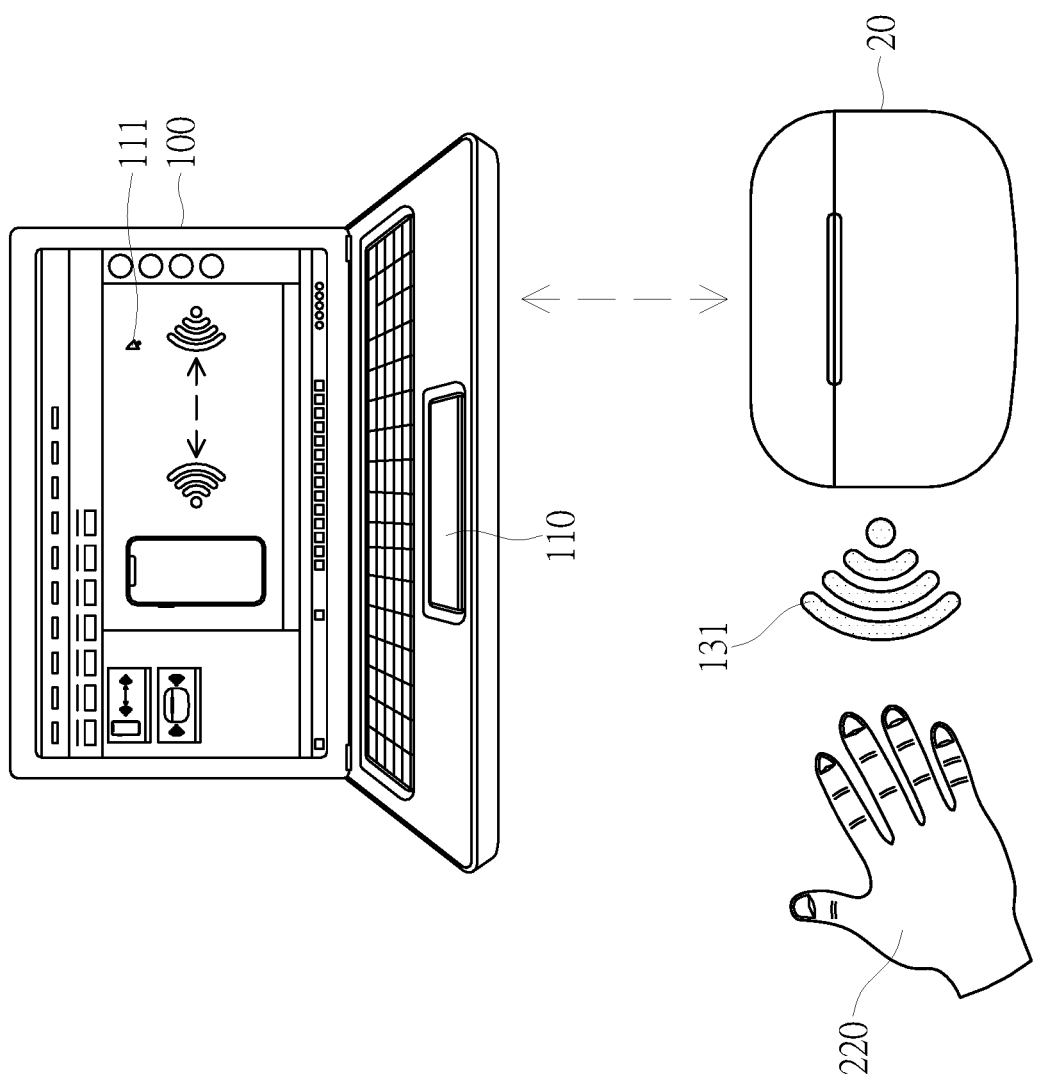
FIG. 7 is a perspective view of an application of the wireless earphone with radar capabilities in another embodiment of the present invention.

With reference to FIG. 7, in another embodiment of the present invention, after the first earphone 10 is placed inside the container 20, the container 20 with the first earphone 10 within is transformed into a presentation controller. The container 20 as the presentation controller is configured to receive controls from the user as the user controls the presentation displayed on the external device 100. In this situation, the first detection result data sent by the present invention to the external device 100 is a presentation control signal generated by the presentation controller. For example, the first detection unit 13 of the first earphone 10 sends out the first detection wave 131 towards a right hand of the user for detecting the right hand gesture 220. The user moves the right hand gesture 220 upwards next to the container 20 with the first earphone 10 within for switching to a previous slide of the presentation, and the user moves the right hand gesture 220 downwards next to the container 20 for switching to a next slide of the presentation.

Figure 8:
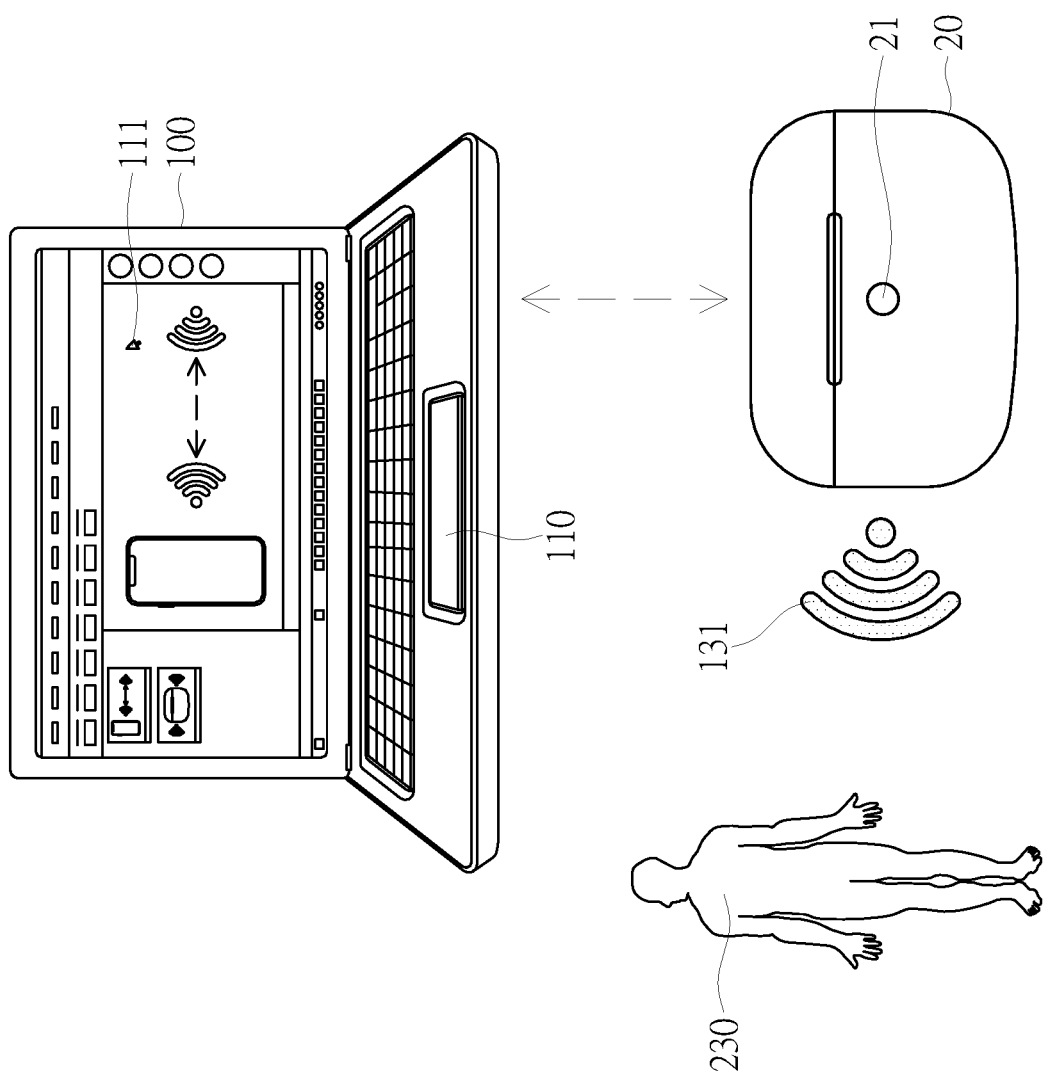
FIG. 8 is a perspective view of an application of the wireless earphone with radar capabilities in yet another embodiment of the present invention.

With reference to FIG. 8, in yet another embodiment of the present invention, the object being detected is the living organism, and the living organism has a torso of an animal. The first detection unit 13 sends out the first detection wave 131 aimed towards the torso of the living organism, and thus the first detection unit 13 receives the first reflected wave 132 reflected from the torso of the living organism. More particularly, for example, the first detection unit 13 sends out the first detection wave 131 aimed towards a chest 230 or a back of the human body 200, and thus the first detection unit 13 receives the first reflected wave 132 reflected from the chest 230 or the back of the human body 200. As such, the first detection result data generated by the first detection unit 13 is a measurement of movements of the torso of the living organism, and this measurement entails a vital signs data of the living organism. Of course, the present invention may also aim at other body parts of the living organism for detecting the vital signs data of the living organism. The vital signs data of the living organism, for example, includes a breathing frequency data or a pulse data. After the first earphone 10 is placed inside the container 20, the container 20 containing the first earphone 10 is transformed into a detector for monitoring a health status of the user. The container 20 as the detector is configured to detect and monitor a breathing frequency or a pulse of the user. In this situation, the first detection result data sent by the present invention to the external device 100 is a health information generated by the detector for monitoring the health status of the user. For example, the user breathes normally beside the container 20 containing the first earphone 10, and the first earphone 10 within the container 20 continuously transmits the first detection wave 131 to detect rise and fall movements or jumping movements of the chest 230 of the user outside of the container 20. The first earphone 10 collects detected data to generate the health information to send to the external device 100, and the external device 100 keeps records and logs of the health information for the user.

Figure 9:
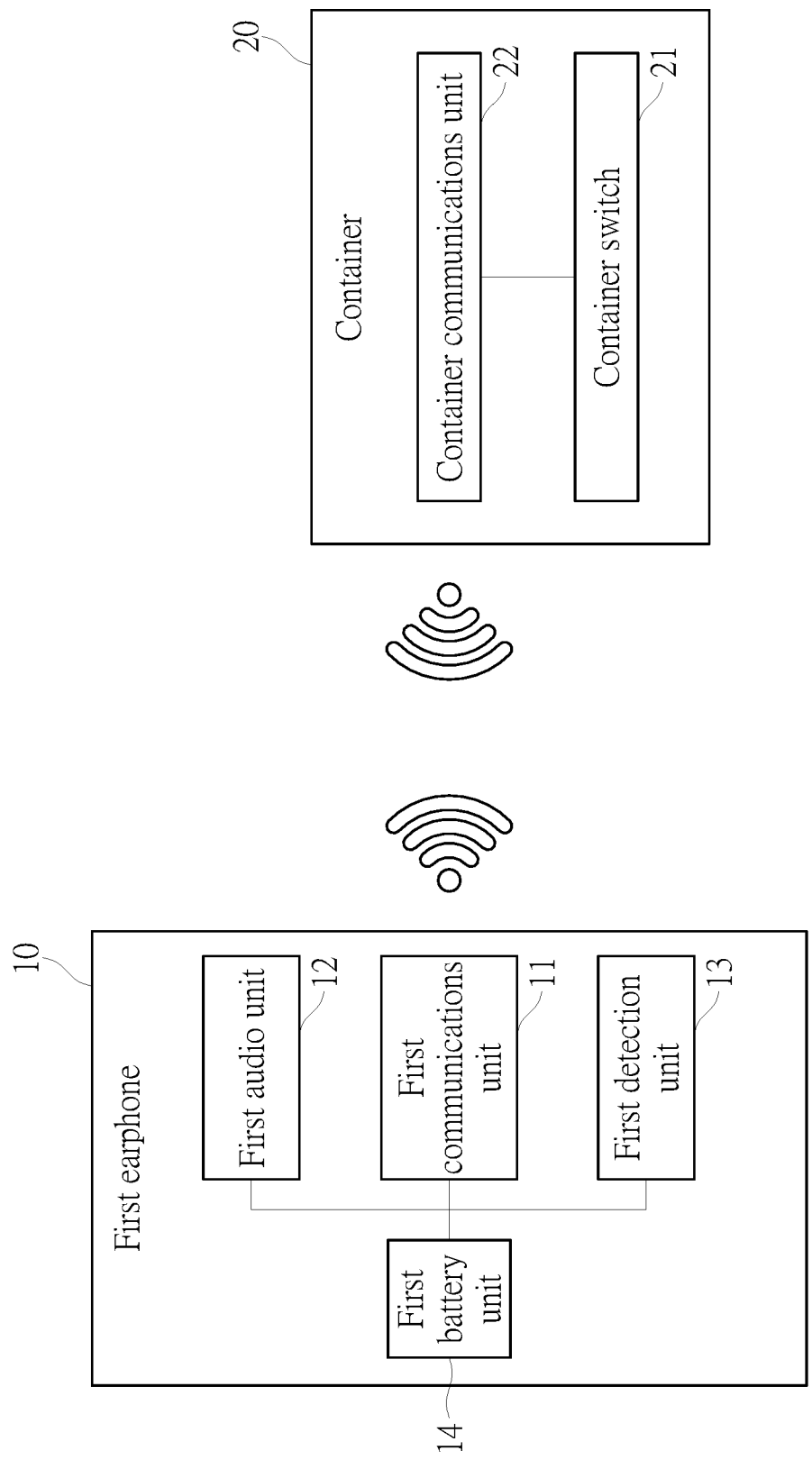
FIG. 9 is a block diagram of a first earphone connecting to a container for the wireless earphone with radar capabilities of the present invention.

With further reference to FIG. 9, in the current embodiment, the container 20 further includes a container switch 21 and a container communications unit 22. The container communications unit 22 is wirelessly connected to the first communications unit 11 of the first earphone 10 by using Bluetooth, and the container communications unit 22 is electrically connected to the container switch 21. The container switch 21 is mounted on the container 20, thus allowing the user to switch on or switch off the container switch 21. The container switch 21 is free to take any form as a switch. In the current embodiment, the container switch 21 is a button. In other embodiments, the container switch 21 may be a tumbler switch.

When the container switch 21 is switched on, the container switch 21 generates a container signal to the container communications unit 22, and the container communications unit 22 sends the container signal to the first communications unit 11 of the first earphone 10. The first communications unit 11 determines whether to send the mode change signal to the external device 100, in accordance to a mode changing mechanism configured for the present invention, according to whether the container signal is received by the first communications unit 11 from the container communications unit 22.

For example, after the first communications unit 11 generates the mode change signal, the first communications unit 11 further determines whether receiving the container signal from the container communications unit 22 of the container 20.

When the first communications unit 11 determines without receiving the container signal, the first communications unit 11 refrains from sending the mode change signal to the external device 100. When the first communications unit 11 determines receiving the container signal, the first communications unit 11 proceeds to send the mode change signal to the external device 100. As such, by switching on or switching off the container switch 21 on the container 20, the user of the present invention can decide whether to enable the aforementioned mode change function of having the container 20, after containing the first earphone 10 and the second earphone 30, sending out the mode change signal to the external device 100 for changing the application mode of using the present invention.

Figure 10:
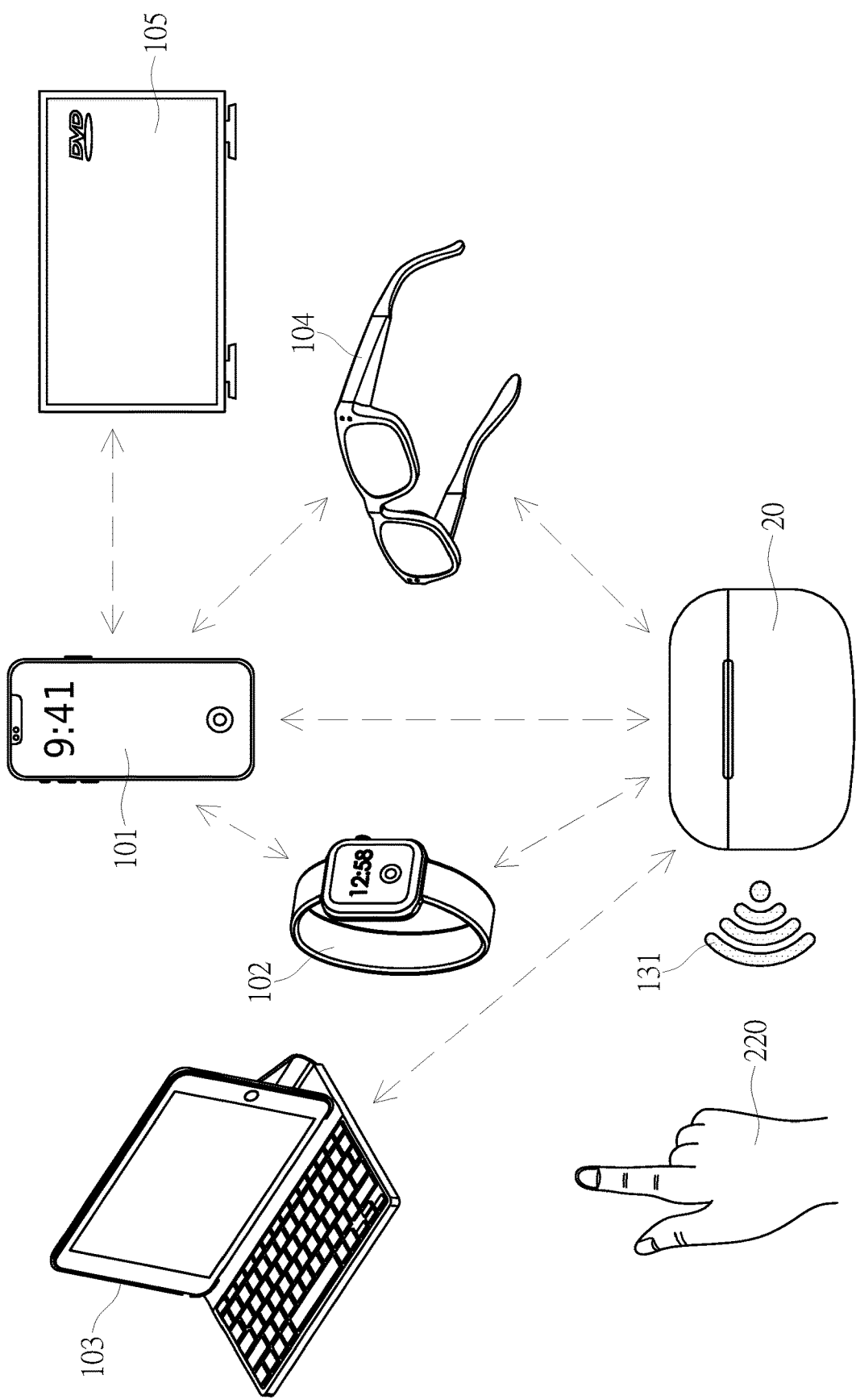
FIG. 10 is a perspective view of an application of the wireless earphone with radar capabilities in another embodiment of the present invention.

Furthermore, with reference to FIG. 10, in another embodiment of the present invention, after the first earphone 10 is placed inside the container 20, the container 20 with the first earphone 10 within is transformed into a controller of a personal device. The said personal device is connected to the first earphone 10 of the present invention through TWS Bluetooth, and the said personal device can be any device with Bluetooth communication capabilities, such as a smart phone 101, a smart watch 102, a tablet computer 103, or a pair of smart glasses 104. The container 20 with the first earphone 10 is configured to receive controls from the user as the user controls the external device 100 that is one of the aforementioned personal devices. In this situation, the first detection result data sent by the present invention to the external device 100 is a command signal remotely controlling the aforementioned personal device.

In an example, the first detection unit 13 of the first earphone 10 sends out the first detection wave 131 towards a right hand of the user for detecting the right hand gesture

220. For example, the user may move the right hand and make the right hand gesture 220 point at a direction for remotely using a keyboard on the said personal device. Alternatively, the user may also simply move the right hand for remotely using the keyboard on the said personal device. The keyboard on the said personal device is free to have any form, for example, the said keyboard can be a keyboard of a game controller, a keyboard of a computer, a button on a touchpad, or a keyboard of any kind of device with Bluetooth communication capabilities. A movement of the right hand from the user corresponds to an application using the keyboard. For example, the movement of waving the right hand to a right side from the user corresponds to an action of pressing a right arrow button on the game controller, and the movement of waving the right hand to a left side from the user corresponds to another action of pressing a left arrow button on the game controller.

With reference to FIG. 7, in another example, the present invention may also replace a function of a user being beside a pointing device and using the pointing device to control a cursor 111. For example, the present invention provides a function to replace a function of the touchpad 110. When the user moves the right hand, the movement of the right hand corresponds to an action of the user remotely moving a location of the cursor 111. When the user uses the right hand to select or to click, the movement of the right hand corresponds to an action of the user remotely selecting or clicking the cursor 111. In other words, the user is free to be away from the touchpad 110 and still be able to fully and remotely use all functions of the touchpad 110. The said touchpad 110 may be a standalone device as the external device 100 with Bluetooth communication capabilities. With reference to FIG. 7, the said touchpad 110 may also be embedded as a part of the said personal device which is the external device 100.

In the case that the external device 100 is the smart phone 101, in an embodiment, the smart phone 101 can also be transformed by the present invention into a command relay for the container 20 with the first earphone 10. In this case, multiple networks of personal devices are connected to the smart phone 101 or the tablet computer 103, for instance, the smart watch 102 is communicatively connected to the smart phone 101 or the tablet computer 103 through Bluetooth, and the pair of smart glasses 104 and a smart television 105 are respectively communicatively connected to the smart phone 101 or the tablet computer 103 through a Wi-Fi wireless network. The container 20 with the first earphone 10 generates the command signal aimed for the smart watch 102 to the smart phone 101 or the tablet computer 103, and the smart phone 101 or the tablet computer 103 then relays the command signal to the smart watch 102. The container 20 with the first earphone 10 may also generate the command signal as a display request to the smart phone 101 or the tablet computer 103, and the smart phone 101 or the tablet computer 103 then relays the display request to the pair of smart sunglasses 104 or the smart television 105, requesting the pair of smart sunglasses 104 or the smart television 105 to display a current screen on the smart phone 101 or the tablet computer 103 with Miracast over the Wi-Fi wireless network. As such, the present invention opens many possibilities for personal devices of the user to be controlled involving the participation of the container 20 with the first earphone 10. Applications enabled by the present invention are free to involve controls of the personal devices more than just controlling keyboard actions, cursor actions and requesting display with Miracast.

Furthermore, in an embodiment, the mode change signal is generated by the external device 100. As such, the user may use the external device 100 for allowing the external device 100 to initiate a mode change, and further allow the first earphone 10 and the container 20 to be differently used for different applications. In other words, the mode change signal is generated by the external device 100. The first detection unit 13 receives the mode change signal from the external device 100 through the first communications unit 11, and the first detection unit 13 changes a meaning of the first detection result data according to the mode change signal received. The external device, capable of generating the mode change signal, is the aforementioned smart device such as the smart phone 101, the smart watch 102, the tablet computer 103, or the pair of smart glasses 104. For example, the user first stores the first earphone 10 inside of the container 20, then the user uses the external device 100 allowing the external device 100 to generate the mode change signal. When the external device 100 generates the mode change signal, for example, the first earphone 10 and the container 20 switch from being used as the aforementioned game controller to the aforementioned presentation controller. This way a mode of how the first earphone 10 and the container 20 are applied to the external device 100 is changed by the external device 100. As such, the meaning of the first detection result data is changed according to the mode change signal. In the present example, the first detection result data is changed for representing a control signal of a game to a control signal for controlling the presentation slides.

Furthermore, in another embodiment of the present invention, the smart device that works in conjuncture with the present invention is simultaneously executing multiple APPs. When either the first earphone 10 or the second earphone 30 is placed in the container 20, the present invention generates the mode change signal, and sends the mode change signal to the external device 100 through the first earphone 10. This way, the present invention changes an application of how the external device 100 is utilized with either the first earphone 10 or the second earphone 30. In other words, in the present embodiment, after the first earphone 10 sends the mode change signal to the external device 100, the first earphone 10 is utilized corresponding to one of the APPs executed by the external device 100, and simultaneously, the second earphone 30 is utilized corresponding to another one of the APPs executed by the external device 100. For example, the smart device is the smart phone 101 or the tablet computer 103, and one of the APPs executed by the smart device is a game, another one of the APPs executed by the smart device is a music player. When the smart device receives the mode change signal from the first earphone 10, the smart device utilizes either the first earphone 10 or the second earphone 30 of the present invention for continuously playing audio from the music player APP, and the smart device also utilizes the other one of the first earphone 10 or the second earphone 30, of which is now contained in the container 20, for switching the mode from playing audio from the game in the game APP to controlling the game as the game controller. Please be reminded that the present invention allows the first earphone 10 and the second earphone 30 to be freely utilized with the external device 100, rather than imposing limitations to how the first earphone 10 and the second earphone 30 should be utilized with the external device 100. The present invention also allows the external device 100 to freely execute APPs or programs as the external device 100 itself intends.

The means to determine whether the first earphone 10 or the second earphone 30 is placed in the container 20 has already been stated in aforementioned paragraphs. In other words, in different embodiments of the present invention, the present invention already reveals how to determine whether the first earphone 10 and the second earphone 30 are both contained in the container 20. The only difference being, in the present embodiment, the present invention only determines whether either the first earphone 10 or the second earphone 30 is placed in the container 20.

For example, in an embodiment, when the first communications unit 11 receives the first recharging signal from the first battery unit 14 or receives the second recharging signal from the second communications unit 31, the first communications unit 11 determines that either the first earphone 10 or the second earphone 30 is placed in the container 20, and thus the first communications unit 11 generates the mode change signal to send to the external device 100.

For example, in another embodiment, when the first communications unit 11 determines whether the first earphone 10 or the second earphone 30 is placed in the container 20 correspondingly according to the first detection result data or the second detection result data, regardless of whether the first earphone 10 or the second earphone 30 needs to reconnect to the external device 100 according to communications protocol configured under TWS settings, the first earphone 10 would be the one to generate the mode change signal to the external device 100 for switching a mode of one of the earphones. This way, the first earphone 10 and the second earphone 30, as two earphones, are able to be independently utilized with the external device 100 for running two different APPs on the external device 100.

What is claimed is:

1. A wireless earphone with radar capabilities, comprising:
    a first earphone, having:
        a first communications unit, configured to wirelessly connect to an external device;
        a first audio unit, electrically connected to the first communications unit; wherein when the first audio unit receives an audio signal from the external device through the first communications unit, the first audio unit generates a first audio according to the audio signal;
        a first detection unit, electrically connected to the first communications unit, and generating a first detection wave; wherein the first detection wave is reflected from an object as a first reflected wave; when the first detection unit receives the first reflected wave, the first detection unit generates a first detection result data, and the first detection unit sends the first detection result data to the external device through the first communications unit;
    wherein the object is moving or vibrating as a living organism or an inorganic object; and
        a first battery unit, electrically connected to the first communications unit, the first audio unit, and the first detection unit, and holding a first earphone charge;
    a container, configured to contain the first earphone; wherein the container further comprises:
        a recharge socket, configured to electrically connect to the first battery unit of the first earphone; and
        a recharge battery, electrically connect to the recharge socket, and holding a recharge station charge;
    wherein when the recharge socket is electrically connected to the first battery unit, the recharge battery recharges the first battery unit with the recharge station charge through the recharge socket, and the first battery unit generates a first recharging signal to the first communications unit;
    wherein when the first communications unit receives the first recharging signal from the first battery unit, the first communications unit determines the first earphone is placed in the container, and thus the first communications unit generates a mode change signal and sends the mode change signal to the external device; and
    wherein when the first earphone is placed inside the container, the first detection unit continues to send the first detection wave and to receive the first reflected wave, and the first communications unit maintains a wireless connection to the external device.

2. The wireless earphone with radar capabilities as claimed in claim 1, wherein the first detection unit determines whether the first earphone is placed in the container according to the first detection result data;
    wherein when the first detection unit determines the first earphone is placed in the container, the first detection unit generates the mode change signal, and sends the mode change signal to the external device through the first communications unit.

3. The wireless earphone with radar capabilities as claimed in claim 1, further comprising a second earphone;
    wherein the second earphone further comprises:
        a second communications unit, wirelessly connected to the first communications unit; wherein when the first communications unit receives the audio signal from the external device, the first communications unit sends the audio signal to the second communications unit;
        a second audio unit, electrically connected to the second communications unit; wherein when the second audio unit receives the audio signal from the first communications unit through the second communications unit, the second audio signal generates a second audio according to the audio signal;
        a second detection unit, electrically connected to the second communications unit, and generating a second detection wave; wherein the second detection wave is reflected from the object as a second reflected wave; when the second detection unit receives the second reflected wave, the second detection unit generates a second detection result data, and the second detection unit sends the second detection result data to the first communications unit through the second communications unit;
    wherein when the first communications unit receives the second detection result data from the second communications unit, the first communications unit sends the second detection result data to the external device;
    wherein the container is also configured to contain the second earphone; when the second earphone is placed inside of the container, the second detection unit continues to send the second detection wave and to receive the second reflected wave, and the second communications unit maintains the wireless connection to the first communications unit.

4. The wireless earphone with radar capabilities as claimed in claim 3, wherein the first communications unit respectively determines whether the first earphone and the second earphone are placed simultaneously in the container according to the first detection result data and the second detection result data;

wherein when the first communications unit determines the first earphone and the second earphone are simultaneously placed in the container, the first communications unit generates the mode change signal, and sends the mode change signal to the external device.

5. The wireless earphone with radar capabilities as claimed in claim 3, wherein:
the second earphone further comprises:
a second battery unit, electrically connected to the second communications unit, the second audio unit, the recharge socket of the container, and the second detection unit, and holding a second earphone charge;
when the recharge socket is electrically connected to the second battery unit, the recharge battery recharges the second battery unit with the recharge station charge through the recharge socket, and the second battery unit generates a second recharging signal to the second communications unit;
when the second communications unit receives the second recharging signal from the second battery unit, the second communications unit sends the second recharging signal to the first communications unit;
when the first communications unit receives the first recharging signal from the first battery unit, and also receives the second recharging signal from the second communications unit, the first communications unit determines the first earphone and the second earphone are placed in the container, and thus the first communications unit generates the mode change signal and sends the mode change signal to the external device.

6. The wireless earphone with radar capabilities as claimed in claim 5, wherein the container further comprises:
a container communications unit, communicatively connected to the first communications unit;
a container switch, electrically connected to the container communications unit, and mounted on the container;
wherein when the container switch is switched on, the container switch generates a container signal to the container communications unit, and the container communications unit sends the container signal to the first communications unit;
wherein the first communications unit determines whether to send the mode change signal to the external device according to whether the container signal is received from the container communications unit.

7. The wireless earphone with radar capabilities as claimed in claim 3, wherein the object detected by the first detection wave and the second detection wave is a human body;
wherein the first detection unit and the second detection unit respectively transmit the first detection wave and the second detection wave aimed towards hands of the human body, and the first detection unit and the second detection unit respectively receive the first reflected wave and the second reflected wave reflected from a left hand gesture and a right hand gesture;
wherein the first detection result data and the second detection result data are respectively a hand gesture detection result data.

8. The wireless earphone with radar capabilities as claimed in claim 3, wherein the first communications unit is wirelessly connected to the external device and the second communications unit with Bluetooth;
wherein the first detection wave generated by the first detection unit, the first reflected wave received by the first detection unit, the second detection wave generated by the second detection unit, and the second reflected wave received by the second detection unit are all millimeter waves.

9. The wireless earphone with radar capabilities as claimed in claim 3, wherein:
the second earphone further comprises:
a second battery unit, electrically connected to the second communications unit, the second audio unit, the recharge socket of the container, and the second detection unit, and holding a second earphone charge;
when the recharge socket is electrically connected to the second battery unit, the recharge battery recharges the second battery unit with the recharge station charge through the recharge socket, and the second battery unit generates a second recharging signal to the second communications unit;
when the second communications unit receives the second recharging signal from the second battery unit, the second communications unit sends the second recharging signal to the first communications unit;
when the first communications unit receives the second recharging signal from the second communications unit, the first communications unit determines the second earphone is placed in the container, and thus the first communications unit generates the mode change signal and sends the mode change signal to the external device.

10. The wireless earphone with radar capabilities as claimed in claim 1, wherein the object detected by the first detection wave is a human body;
wherein the first detection unit transmits the first detection wave aimed towards a hand of the human body, and the first detection unit receives the first reflected wave reflected from a left hand gesture or a right hand gesture;
wherein the first detection result data is a hand gesture detection result data.

11. The wireless earphone with radar capabilities as claimed in claim 1, wherein the object detected by the first detection wave is the living organism;
wherein the first detection unit transmits the first detection wave aimed towards the living organism, and the first detection unit receives the first reflected wave reflected from the living organism;
wherein the first detection result data is a vital signs data of the living organism.

12. The wireless earphone with radar capabilities as claimed in claim 1, wherein the first communications unit is wirelessly connected to the external device with Bluetooth;
wherein the first detection wave generated by the first detection unit and the first reflected wave received by the first detection unit are both millimeter waves.

13. The wireless earphone with radar capabilities as claimed in claim 1, wherein the first communications unit determines whether the first detection result data is a power off command; when the first communications unit determines the first detection result data is the power off command, the first communications unit powers off the first earphone.

14. The wireless earphone with radar capabilities as claimed in claim 1, wherein the container further comprises:
a container communications unit, communicatively connected to the first communications unit;
a container switch, electrically connected to the container communications unit, and mounted on the container;

wherein when the container switch is switched on, the container switch generates a container signal to the container communications unit, and the container communications unit sends the container signal to the first communications unit;

wherein the first communications unit determines whether to send the mode change signal to the external device according to whether the container signal is received from the container communications unit.

15. The wireless earphone with radar capabilities as claimed in claim 1, wherein the first communications unit is wirelessly connected to the external device with Bluetooth;

wherein the first detection result data is a command signal to remote control the external device.

16. The wireless earphone with radar capabilities as claimed in claim 1, wherein the first communications unit is wirelessly connected to the external device with Bluetooth, and the external device is a smart phone or a tablet computer;

wherein the first detection result data is a command signal to remote control a smart watch, a pair of smart glasses, or a smart television, and the external device that receives the first detection result data is a command relay;

wherein the smart phone or the tablet computer is communicatively connected to the smart watch, the pair of smart glasses, or the smart television for correspondingly relaying the command signal to the smart watch, the pair of smart glasses, or the smart television.

17. The wireless earphone with radar capabilities as claimed in claim 1, wherein the first communications unit is wirelessly connected to the external device with Bluetooth, and the external device is a pointing device;

wherein the first detection result data is a command signal to remote control a cursor of the pointing device.

18. The wireless earphone with radar capabilities as claimed in claim 1, wherein the first communications unit is wirelessly connected to the external device with Bluetooth;

wherein the first detection unit receives the mode change signal from the external device through the first communications unit, and the first detection unit changes a meaning of the first detection result data according to the mode change signal.

19. The wireless earphone with radar capabilities as claimed in claim 1, wherein the object detected by the first detection wave is the living organism;

wherein the first detection unit transmits the first detection wave aimed towards the living organism, and the first detection unit receives the first reflected wave reflected from the living organism;

wherein the first detection result data is a breathing frequency data or a pulse data of the living organism.

* * * * *